United States Patent [19]
Turner

[11] Patent Number: 4,723,254
[45] Date of Patent: Feb. 2, 1988

[54] RECYCLING APPARATUS FOR AN EXCIMER LASER

[76] Inventor: Robert E. Turner, 2 Quincy Ct., Setauket, N.Y. 11733

[21] Appl. No.: 736,870

[22] Filed: May 22, 1985

Related U.S. Application Data

[63] Continuation-in-part of Ser. No. 605,772, May 1, 1984.

[51] Int. Cl.$^4$ ............................................. H01S 3/22
[52] U.S. Cl. ................................... 372/59; 372/57; 372/60
[58] Field of Search ............................ 372/57, 58–60, 372/55

[56] References Cited

U.S. PATENT DOCUMENTS 4,196,400 4/1980 Martin ................................... 372/59

OTHER PUBLICATIONS

Johnson et al.; "A Closed-cycle Gas Recirculating System for Rare-gas Halide Lasers"; Appl. Phys. Lett. 32(5), Mar. 1, 1978, p. 291

Primary Examiner—Leon Scott, Jr.
Attorney, Agent, or Firm—Roberts, Spiecens & Cohen

[57] ABSTRACT

For an excimer laser system utilizing in a laser chamber a lasing material and a mixture of a diluent rare gas and a heavy rare gas and halogen rare gas in given percentages, there is disclosed a method and apparatus for reducing the expenditure of the rare gases by continuously evacuating the laser mixture from the laser chamber removing from the evacuated laser mixture any gaseous impurities to provide a cleaned laser mixture and thereafter feeding the cleaned laser mixture back into the laser chamber. Along with the cleaned laser mixture there is fed in a supplemental halogen gas. The gaseous impurities along with the halogen are removed by passing the gas through an elongated tube having calcium particles therein with a void fraction for a given length of tube in the range 0.30 to 0.60. Some of the ratio is obtained by providing alternate layers of calcium particles and inert, refractory spacers, such as stainless steel wool.

20 Claims, 3 Drawing Figures

HOT METAL REACTOR
20A

RECYCLING APPARATUS FOR AN EXCIMER LASER

REFERENCE TO RELATED APPLICATIONS

This application is a continuation-in-part of my application Ser. No. 605,772 filed May 1, 1984.

BACKGROUND OF THE INVENTION

This invention pertains to excimer lasers and, more particularly, to the conservation of the gases used in an excimer laser.

One of the most successful new laser technologies to have emerged in recent years is a new family of powerful gas lasers called excimer lasers. These lasers are unique in that they are efficient sources of high powered ultra-violet light. This property makes these lasers very useful for a wide range of scientific as well as industrial and military operations.

An economic limitation to the long-term use of excimer lasers has been the high cost of operation. A significant portion of this cost has been due to the consumption of expensive rare gases such as krypton or xenon as well as moderately expensive gases such as argon, helium and neon. Ordinarily, the lasing gas mixture which is a combination of a heavy rare gas, a diluent rare gas and a halogen gas is fed into the laser and withdrawn from the laser after the lasing has been performed. Because of the cost of the rare gases, the excimer laser can be expensive to operate. However, the present inventor was part of a team which developed a closed-cycle recirculating system for rare gas halide excimer lasers. The results of this invention were published in Applied Physics Letters, Volume 32 (5) on Mar. 1, 1978, starting on Page 291 thereof. (This idea is also discussed in Excimer Laser Chemical Problems, Los Alamos National Laboratory document Number Q-8-L-169..) While the proposed system has performed admirably to reduce the cost of the gases by virtue of the fact that the heavy rare gases are cleaned and recirculated after the removal of the halogen and fed back to the laser along with fresh halogen gas, there is a demand for better means for removing formed impurities.

In particular, it has been found that calcium metal, in the form of particles, is an excellent bulk getter of chemical impurities in rare gas streams. Furthermore, the efficiency of cleanup increases with temperature. However, because of the formation of calcium vapor at high temperatures, calcium particles tend to fuse together. This fusion can eventually form a plug which constricts gas flow through a tube containing heated calcium particles. To overcome the problem, large particles of calcium sponge have been used which somewhat extend the operating time before eventual plugging occurs.

BRIEF SUMMARY OF THE INVENTION

It is, accordingly, a general object of the invention to further minimize the cost of operation of an excimer laser.

It is another object of the invention to provide efficient means for removing contaminated material from the gases of an excimer laser.

It is a further object of the invention to prolong the life of calcium metal as the getter material.

Briefly, in accordance with one aspect of the invention, there is contemplated apparatus for conserving the expenditure of diluent rare gas and heavy rare gas in an excimer laser system utilizing in a laser chamber a mixture of the diluent rare gas, the heavy rare gas and a halogen. The apparatus includes withdrawing means for continuously withdrawing the gas mixture from the lasing chamber and cleaning means for removing halogen compounds from the withdrawn gas mixture.

According to another aspect of the invention, there is provided apparatus for removing chemical impurities from a rare gas stream. The apparatus is an elongated tubular member having an inlet for accepting the rare gas stream and an outlet for passing the rare gas stream and calcium particles within said tubular member. The void fraction for a given length of tubing is in the range of 0.30 to 0.60.

BRIEF DESCRIPTION OF THE DRAWING

Other objects, the features and advantages of the invention will be apparent from the following detailed description when read in conjunction with the accompanying drawings.

In the Drawing.

DETAILED DESCRIPTION

Figure 1:
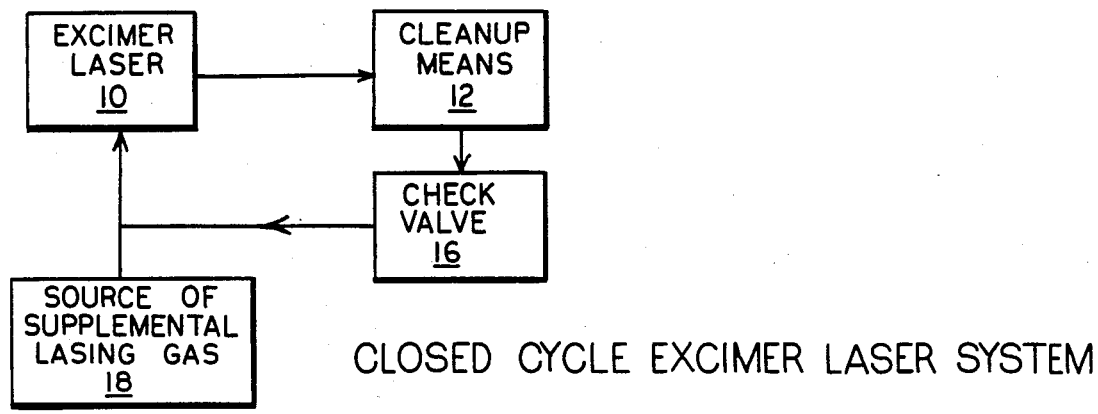
FIG. 1 is a schematic block diagram of a closed-cycle excimer laser system utilizing the invention.

In FIG. 1 the closed-cycle excimer laser system centers around the excimer laser 10. The excimer laser 10 is a conventional design and in its lasing chamber has a gas mixture of a halogen, a heavy rare gas and a diluent rare gas. A typical lasing gas mixture would be a halogen gas such as flourine or gaseous hydrogen chloride in concentrations of 10ths of a percent, a heavy rare gas such as argon, krypton or xenon in concentrations of the order of 1 to 10 percent and a diluent rare gas such as helium and/or neon in concentrations in the order of 90 percent. Because of the lasing action, there are formed gaseous and particulate compounds which are not removed from the laser and which will eventually reduce the efficiency of operation and finally quench any possible lasing action. Therefore, in accordance with the invention, the lasing mixture is exhausted br removed from the excimer laser 10 and passed through the cleanup means 12. In the cleanup means 12 the halogen compounds are removed from the gas mixture so that at the output of the cleanup means 12 there is a pure gas mixture of the heavy rare gas and the diluent rare gas. The cleaned gas mixture is fed via a check valve 16 back to the excimer laser 10. Since the halogen has been removed it is now necessary to replenish the gas mixture with the halogen gas. Accordingly, there is also fed into the input of the laser 10 a supplemental gas from the source 18. The details of this supplemental halogen gas are fully described in the above-cited application.

The various components of the system will now be described.

The source of supplemental laser gas 18 can be a cylinder with a metering valve to control the flow of the supplemental gas. The check valve 16 can be a conventional check valve.

Figure 2:
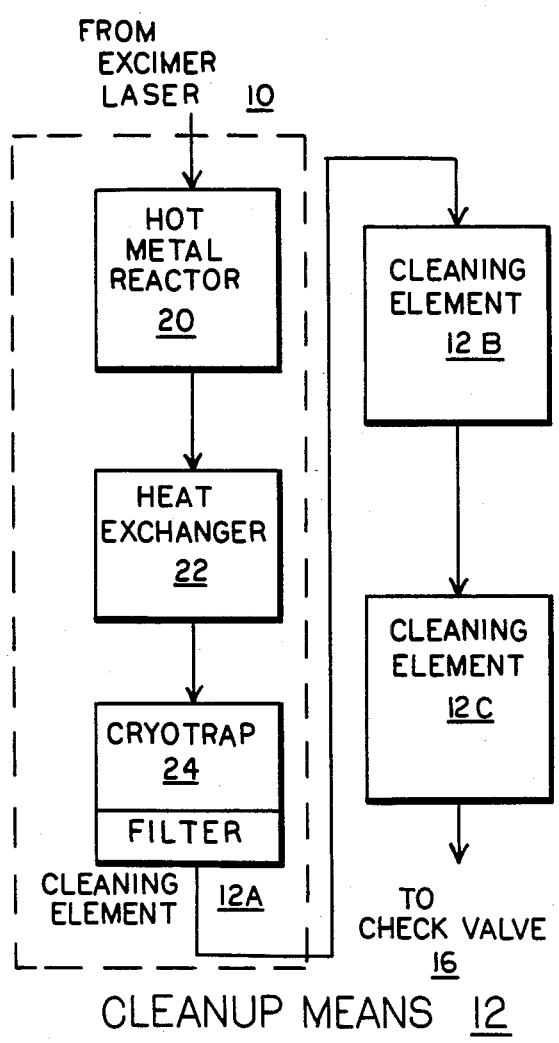
FIG. 2 is a schematic diagram of the cleanup means of the system of FIG. 1.

In FIG. 2 there is shown the cleanup means 12 as a combination of three cleaning elements 12A to 12C connected in series. Each cleaning element includes a hot metal reactor followed by a heat exchanger which is followed by a cryotrap-filter combination. A typical hot metal reactor 20 can be a type in which there is included a metal reagent. The metals can be alkali metals such as sodium or lithium, alkaline earth metals such as calcium or barium or transition metals.

Figure 3:
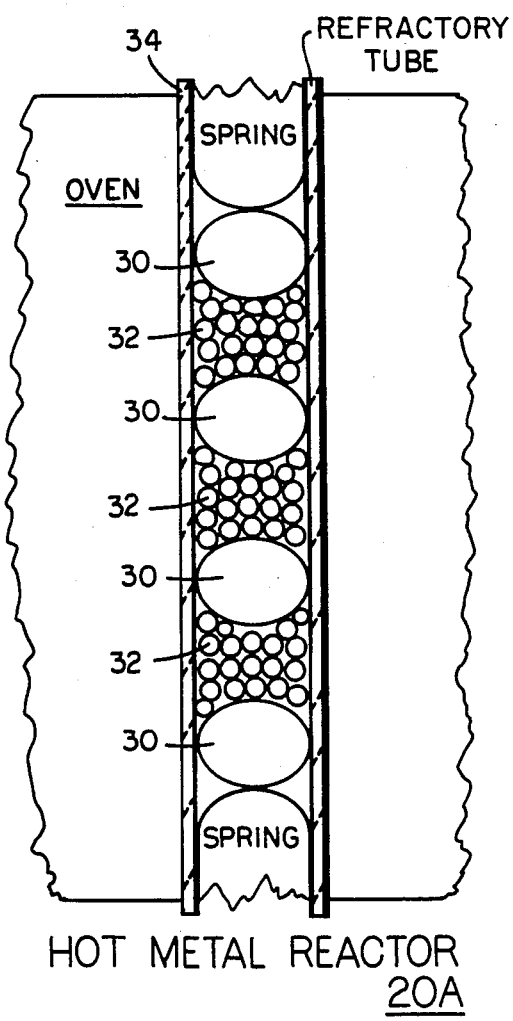
FIG. 3 is a cross section of gas cleanup apparatus utilizing calcium metal in accordance with the invention.

In FIG. 3 there is shown a hot metal reactor 20A using calcium particles in accordance with the invention. In order to use calcium efficiently several phenomena are worth noting. As the gas passes over the calcium particles the halogen diffuses into the particles, thus the rate of cleanup is related to the rate of diffusion which, in turn, is related to the ratio of particle surface area to particle volume for a given temperature. In addition, calcium vaporizes and has significant vapor pressure, thus the calcium vapor when condensing tends to cause plugging. Therefore, as a first step, one should use large calcium particles. In accordance with the invention, it is preferable to use commercially available calcium sponge or turnings in the range of 2 to 4 mesh.

In addition, the void fraction, i.e.: the quotient of void volume of a passageway to calcium particle volume in such passageway, should be in the range of 0.30 to 0.60 and, optimally, 0.35. In such case, the inside diameter of a tubular passageway for the above-preferred particle sizes should be between 0.75 and 2.0 inches. Furthermore, the void fraction can be controlled by alternately laying regions of calcium particles and spacers. Accordingly, the hot metal reactor 20A of FIG. 3 shows alternate layers of inert, refractory spacers 30 and calcium particles 32 in a hollow tube 34. It has been found preferable for the quotient of the axial length of a layer of calcium particles to a layer of spacers to be in the range of 1.5 to 5.0. (Note that the use of spacers, such as steel wool, has the additional advantage of providing condensation sites for calcium vapor.)

In order to enhance the gettering it is preferable to heat the calcium particles to within a celsius temperature range of 500° to 700°. Therefore, the tube 34 is surrounded by oven 36 (not shown in detail, but which can be of the resistance; microwave or RF induction type). Furthermore, the tube is of a refractory material such as stainless steel, Inconel, quartz, alumina or the like.

The output of the reactor 20 will include the rare gases as well as either metal halides or metal vapors in a gaseous state. These gases are now fed through a typical heat exchanger 22 which can be a pipe with a flowing cold-water jacket to drop the temperature of the gas to the order of room temperature. This dropping of the temperature causes a major portion of the halides and/or metal vapor to precipitate out. However, all of the halides do not precipitate. The moderately cleaned gases are now fed to a cryotrap-filter 24 which again can be a pipe with a jacket through which passes a refrigerant. The cryotrap will drop the temperature of the gases to approximately 40° below zero further forcing more precipitation. Within the cryotrap and in the path of the gases is a filter to remove the precipitates. The other two cleanup elements 12B and 12C are similarly constructed.

While only one embodiment of the invention has been shown and described in detail, there will now be obvious to those skilled in the art many modifications and variations satisfying many or all of the objects of the invention without departing from the spirit thereof.

What is claimed is:

1. Apparatus for removing chemical impurities from a rare gas stream comprising an elongated tubular member of given volume having an inlet for accepting the rare gas stream and an outlet for passing the rare gas stream and calcium particles of given volume within said tubular member, the quotient of the empty volume of the tubular member to the volume of calcium particles in said tubular member for a given length of said tubular member being in the range of 0.03 to 0.60.

2. The apparatus of claim 1 wherein said calcium particles have a size of 2 to 4 mesh and the inner diameter of said tubular member being from 0.75 to 2.00 inches.

3. The apparatus of claim 1 wherein said calcium particles occupy only a portion of said given length and further comprising inert, refractory spacer means in the remainder of said given length.

4. The apparatus of claim 3 wherein there is at least two layers of calcium particles and said inert spacer means is a layer of a metal wool interposed between the two layers of calcium particles.

5. The apparatus of claim 4 wherein the ratio of the length of a layer of calcium particles to a layer of metal wool being in the range of 1.5 to 5.

6. The apparatus of claim 1 wherein said elongated tubular member is of a refractory material and further means for heating said calcium particles to a temperature in the range of 500° to 700° C.

7. The apparatus of claim 1 wherein said calcium particles are arranged within said tubular member in a plurality of axially displaced layers and further comprising a plurality of layers of stainless steel wool, the layers of stainless steel wool axially alternating with the layers of calcium particles along the length of said tubular member.

8. The apparatus of claim 7 wherein the ratio of the length of a layer of calcium particles to a layer of metal wool being in the range of 1.5 to 5.0.

9. The apparatus of claim 8 wherein said calcium particles have a size of 2 to 4 mesh and the inner diameter of said tubular member being from 0.75 to 2.00 inches.

10. The apparatus of claim 9 wherein said elongated tubular member is of a refractory material and further means for heating said calcium particles to a temperature in the range of 500° to 700° C.

11. Apparatus for removing chemical impurities from a rare gas stream comprising an elongated tubular member having an inlet and an outlet, at least two layers of particles of calcium and at least one layer of metal spacers between said two layers of particles of calcium, said layers being axially aligned within said elongated tubular member.

12. The apparatus of claim 11 wherein said calcium particles have a size of 2 to 4 mesh and the inner diameter of said tubular member being from 0.75 to 2.00 inches.

13. The apparatus of claim 12 wherein the ratio of the length of a layer of calcium particles to a layer of metal wool being in the range of 1.5 to 5.0.

14. The apparatus of claim 13 wherein said elongated tubular member is of a refractory material and further means for heating said calcium particles to a temperature in the range of 500° to 700° C.

15. Apparatus for conserving the expenditure of diluent rare gas and heavy rare gas in an excimer laser system utilizing in a laser chamber a mixture of the diluent rare gas, the heavy rare gas and a halogen, said apparatus comprising: withdrawing means for continuously withdrawing the gas mixture from the lasing chamber; cleaning means for removing halogen compounds from the withdrawn gas mixture, said cleaning means comprising an elongated tubular member of given volume having an inlet for accepting the rare gas stream and an outlet for passing the rare gas stream and calcium particles of given volume within said tubular member, the quotient of the empty volume of tubular member to the volume of calcium particles in said tubular member for a given length of said tubular member being in the range of 0.30 to 0.60; means for returning the cleaned gas mixture back to the lasing chamber; and means for adding to the mixture another gas mixture comprising at least the halogen gas.

16. The apparatus of claim 15 wherein said calcium particles have a size of 2 to 4 mesh and the inner diameter of said tubular member being from 0.75 to 2.00 inches.

17. The apparatus of claim 15 wherein said calcium particles occupy only a portion of said given length and further comprising metal spacer means in the remainder of said given length.

18. The apparatus of claim 17 wherein there are at least two layers of calcium particles and said metal spacer means is a layer of metal wool interposed between the two layers of calcium particles.

19. The apparatus of claim 15 wherein said elongated tubular member is of a refractory material and further comprising means for heating said calcium particles to a temperature in the range of 500° to 700° C.

20. The apparatus of claim 15 wherein said calcium particles are arranged within said tubular member in a plurality of axially displaced layers and further comprising a plurality of layers of stainless steel wool, the layers of stainless steel wool axially alternating with the layers of calcium particles along the length of said tubular member.

* * * * *